United States Patent
Sobanski et al.

(10) Patent No.: US 12,460,577 B2
(45) Date of Patent: Nov. 4, 2025

(54) AFT GEAR BASED ENGINE WITH HEAT RECOVERY SYSTEM

(71) Applicant: RTX CORPORATION, Farmington, CT (US)

(72) Inventors: Jon Erik Sobanski, Glastonbury, CT (US); Jeffrey T. Morton, Manchester, CT (US); Andrew E. Breault, Bolton, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/618,098

(22) Filed: Mar. 27, 2024

(65) Prior Publication Data

US 2025/0305455 A1    Oct. 2, 2025

(51) Int. Cl.

| | |
|---|---|
| *F02C 7/20* | (2006.01) |
| *F02C 3/10* | (2006.01) |
| *F02C 7/36* | (2006.01) |
| *F02K 3/06* | (2006.01) |
| *F16H 57/02* | (2012.01) |
| *F16H 57/025* | (2012.01) |

(52) U.S. Cl.
CPC .............. *F02C 7/20* (2013.01); *F02C 3/10* (2013.01); *F02C 7/36* (2013.01); *F02K 3/06* (2013.01); *F16H 2057/02039* (2013.01); *F16H 57/025* (2013.01)

(58) Field of Classification Search
CPC ...... F02C 3/10; F02C 3/30; F02C 3/06; F02C 7/14; F02C 7/20; F02C 7/36; F16H 57/025; F16H 2057/02039; F02K 1/56; F02K 1/74; F02K 3/06; F01D 15/12; F01D 25/28

See application file for complete search history.

(56) References Cited

U.S. PATENT DOCUMENTS

| | | | | |
|---|---|---|---|---|
| 3,678,690 A | * | 7/1972 | Shohet | F02K 3/06 60/226.3 |
| 4,766,723 A | * | 8/1987 | Newton | F02C 7/20 416/129 |
| 4,951,461 A | * | 8/1990 | Butler | F02C 3/067 416/129 |

(Continued)

OTHER PUBLICATIONS

Extended European Search Report for European Application No. 25166841.4 mailed Sep. 10, 2025.

*Primary Examiner* — Gerald L Sung
*Assistant Examiner* — Henry Ng
(74) *Attorney, Agent, or Firm* — Carlson, Gaskey & Olds, P.C.

(57) ABSTRACT

A propulsion system for an aircraft includes a propulsor section that includes a fan with a plurality of fan blades that are rotatable about a fan axis, a core engine that is configured to generate a gas flow, a power turbine that is mechanically uncoupled from the core engine and rotatable independent of the core engine, the gas flow from the core engine is expanded through the power turbine to generate shaft power, a support structure where the power turbine is mounted relative the core engine, a fan drive gear system that is driven by the power turbine and at least partially mounted to the support structure, and a power turbine shaft that includes a first coupling to the fan drive gear system and a second coupling to the propulsor section.

16 Claims, 5 Drawing Sheets

(56) References Cited

U.S. PATENT DOCUMENTS

| | | | | |
|---|---|---|---|---|
| 5,079,916 | A * | 1/1992 | Johnson | F02K 3/072 416/129 |
| 5,312,069 | A | 5/1994 | Bollinger et al. | |
| 9,217,391 | B2 | 12/2015 | Gallet et al. | |
| 10,837,364 | B2 | 11/2020 | Roberge | |
| 11,149,643 | B2 | 10/2021 | Schwarz et al. | |
| 11,339,679 | B1 * | 5/2022 | Lefebvre | F01D 17/02 |
| 11,480,103 | B2 | 10/2022 | Boucher et al. | |
| 11,512,637 | B2 | 11/2022 | Payyoor et al. | |
| 11,655,767 | B2 | 5/2023 | Hrubec et al. | |
| 11,754,021 | B2 | 9/2023 | Boucher et al. | |
| 2003/0162630 | A1 * | 8/2003 | Poulin | F16H 57/082 475/346 |
| 2010/0133832 | A1 * | 6/2010 | Butt | F02K 3/072 290/46 |
| 2010/0290903 | A1 * | 11/2010 | Heyerman | F01D 25/162 415/213.1 |
| 2011/0197595 | A1 * | 8/2011 | Journade | F02C 7/20 60/797 |
| 2012/0177493 | A1 * | 7/2012 | Fabre | F02C 7/36 416/129 |
| 2013/0205747 | A1 * | 8/2013 | Suciu | F02K 3/06 29/889.22 |
| 2015/0285100 | A1 * | 10/2015 | Sultana | F02K 1/04 248/74.1 |
| 2016/0108817 | A1 * | 4/2016 | Bagnall | F01D 5/02 60/796 |
| 2016/0115866 | A1 * | 4/2016 | Suciu | F02C 3/14 60/39.12 |
| 2017/0030222 | A1 * | 2/2017 | De Sousa | B64D 27/402 |
| 2018/0135512 | A1 * | 5/2018 | Poulin | F16H 3/54 |
| 2018/0283272 | A1 | 10/2018 | Curlier et al. | |
| 2019/0017382 | A1 * | 1/2019 | Clements | F01D 5/03 |
| 2020/0326071 | A1 * | 10/2020 | Debray | F02C 7/20 |
| 2022/0136410 | A1 * | 5/2022 | Lefebvre | F01D 25/002 415/169.2 |
| 2022/0205391 | A1 * | 6/2022 | Anderson | F02C 7/20 |
| 2022/0325635 | A1 * | 10/2022 | Hirata | F01D 9/041 |
| 2023/0151741 | A1 * | 5/2023 | Bifulco | F01D 9/042 415/182.1 |
| 2023/0286661 | A1 * | 9/2023 | Klingels | F02C 7/16 |
| 2024/0067349 | A1 * | 2/2024 | Shinde | F02C 7/20 |
| 2024/0151397 | A1 * | 5/2024 | Martinez | F02C 3/10 |
| 2024/0280053 | A1 * | 8/2024 | Sibbach | F02C 7/04 |

\* cited by examiner

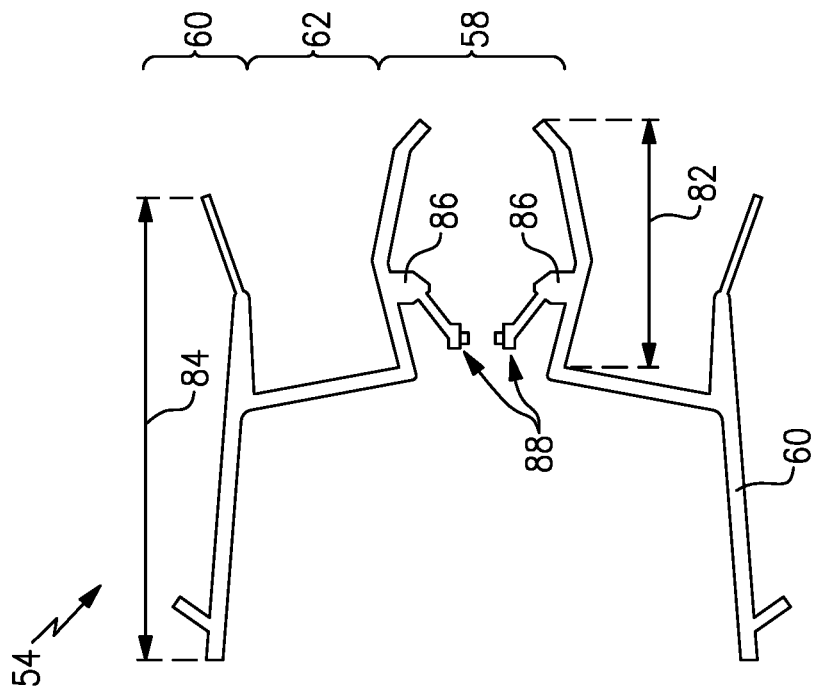
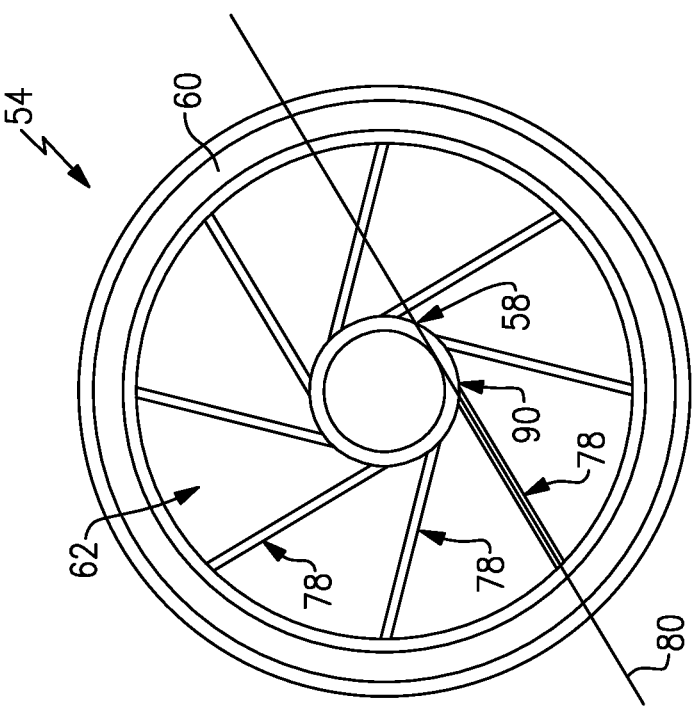

AFT GEAR BASED ENGINE WITH HEAT RECOVERY SYSTEM

TECHNICAL FIELD

The present disclosure relates generally to an aircraft turbine engine with a heat recovery system and decoupled power turbine driving a propulsive fan through a speed change gearbox.

BACKGROUND

Reduction and/or elimination of carbon emissions generated by aircraft operation is a stated goal of aircraft manufacturers and airline operators. Gas turbine engines generally include a gas generating core engine that drives a propulsive fan through a nested shaft. In some engine architectures the shaft driving the fan may be relatively long as compared to the overall engine structure. Rotor dynamic stability of long shafts can be challenging and require additional bearing structures. Additional bearing structures can complicate engine architectures and inhibit implementation of other desirable engine features.

SUMMARY

A propulsion system for an aircraft according to an exemplary embodiment of this disclosure, among other possible things includes a propulsor section that includes a fan with a plurality of fan blades that are rotatable about a fan axis, a core engine that is configured to generate a gas flow, a power turbine that is mechanically uncoupled from the core engine and rotatable independent of the core engine, the gas flow from the core engine is expanded through the power turbine to generate shaft power, a support structure where the power turbine is mounted relative the core engine, a fan drive gear system that is driven by the power turbine and at least partially mounted to the support structure, and a power turbine shaft that includes a first coupling to the fan drive gear system and a second coupling to the propulsor section.

In a further embodiment of the foregoing propulsion system, an axial length of the power turbine shaft between the first coupling and the second coupling is greater than an axial length between the power turbine and the fan drive gear system.

In a further embodiment of any of the foregoing propulsion systems, the support structure extends axially between a fan support member and the core engine.

In a further embodiment of any of the foregoing propulsion systems, the support structure includes a fairing section that includes a plurality of fairings that extend between a center portion and an outer portion. Each of the plurality of fairings are tangential to an outer periphery of the center portion.

In a further embodiment of any of the foregoing propulsion systems, the center portion includes an aft portion that extends axially aft from the fairing section and the power turbine is attached to the aft portion.

In a further embodiment of any of the foregoing propulsion systems, the fan drive gear system is attached to the aft portion between the power turbine and the fairing section.

In a further embodiment of any of the foregoing propulsion systems, the fan drive gear system includes a first gearbox that is mounted in the propulsor section and a second gearbox that is mounted to the support structure.

In a further embodiment of any of the foregoing propulsion systems, the fan drive gear system includes a first gear box and a second gearbox that are both mounted to the support structure.

In a further embodiment of any of the foregoing propulsion systems, the propulsor section is forward of the power turbine and the core engine is disposed aft of the power turbine.

In a further embodiment of any of the foregoing propulsion systems, the core engine is centered on a core axis that is inclined relative to the fan axis.

In a further embodiment of any of the foregoing, the propulsion system further includes a nacelle that surrounds the core engine and the propulsor section. The nacelle defines a bypass flow path through the nacelle and around the power turbine and the core engine.

In a further embodiment of any of the foregoing, the propulsion system further includes a heat recovery system that is at least partially supported by at least one of the support structure and the nacelle.

An aircraft turbine engine assembly according to another exemplary embodiment of this disclosure, among other possible things includes a fan section that includes a fan with a plurality of fan blades that are rotatable about a fan axis, a core engine that defines a core flow path where air is compressed in a compressor section, communicated to a combustor section, mixed with fuel, and ignited to generate a gas flow that is expanded through a main turbine section, a power turbine that is mechanically uncoupled from the core engine and rotatable independent of the core engine, the gas flow from the core engine is expanded through the power turbine to generate shaft power, a support structure where the power turbine is mounted relative the core engine, a fan drive gear system that is driven by the power turbine and at least partially mounted to the support structure, and a power turbine shaft that includes a first coupling to the fan drive gear system and a second coupling to the fan. An axial length of the power turbine shaft between the first coupling and the second coupling is greater than an axial length between the power turbine and the fan drive gear system.

In a further embodiment of the foregoing aircraft turbine engine assembly, the support structure includes a fairing section that includes a plurality of fairings that extend between a center portion and an outer portion. Each of the plurality of fairings are tangential to an outer periphery of the center portion and the center portion includes an aft portion that extends axially aft from the fairing assembly and the power turbine is attached to the aft portion.

In a further embodiment of any of the foregoing aircraft turbine engine assemblies, the fan drive gear system includes a first gearbox that is mounted in the fan section and a second gearbox that is mounted to the support structure.

In a further embodiment of any of the foregoing aircraft turbine engine assemblies, the fan drive gear system includes a first gear box that is coupled to a second gearbox with both mounted to the support structure.

In a further embodiment of any of the foregoing aircraft turbine engine assemblies, the core engine is centered on a core axis that is inclined relative to the fan axis.

In a further embodiment of any of the foregoing, the aircraft turbine engine assembly further includes a nacelle that surrounds the core engine and the fan. The nacelle defines a bypass flow path through the nacelle and around the power turbine and the core engine.

A method of operating an aircraft turbine engine assembly according to another exemplary embodiment of this disclosure, among other possible things includes generating a gas flow with a core engine, expanding the gas flow through a power turbine that is mechanically decoupled from the core engine, driving a gear system with the power turbine, and driving a fan with a power turbine shaft that is driven by the gear system at a speed less than that of the power turbine. The power turbine shaft is of an axial length that is greater than an axial length between the gear system and the power turbine.

In a further embodiment of the foregoing, the method further includes supporting the gear system with a support structure that includes a fairing section that includes a plurality of fairings that extend between a center portion and an outer portion. Each of the plurality of fairings are tangential to an outer periphery of the center portion.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a front view of an example support structure embodiment.

FIG. 3 is a cross-sectional view of the example support structure embodiment of FIG. 2.

DETAILED DESCRIPTION

Figure 1:
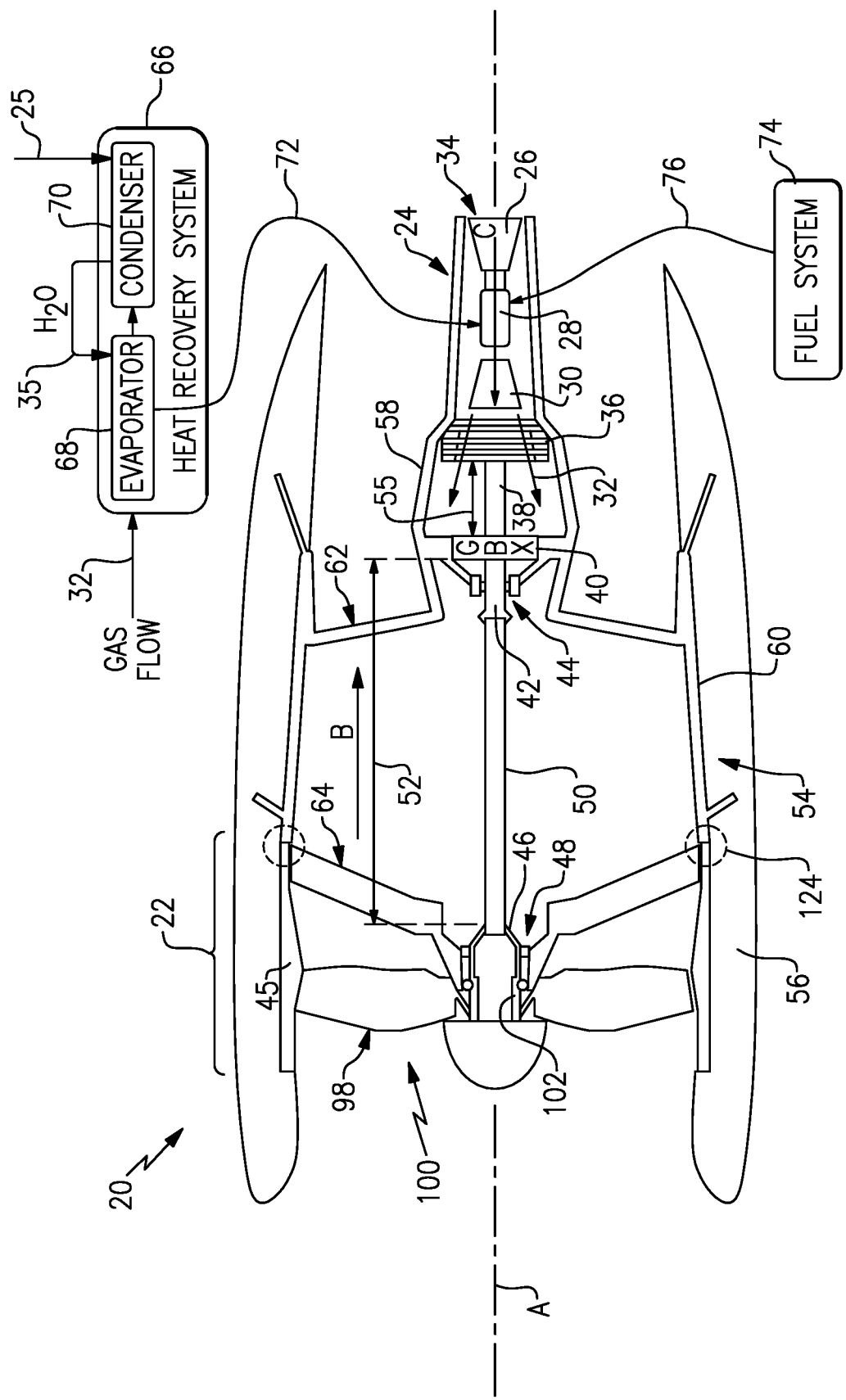
FIG. 1 is a schematic view of an example aircraft propulsion system.

FIG. 1 schematically illustrates an example aircraft propulsion system 20 with a gas generating core engine 24 spaced apart from a propulsive fan section 22. Decoupling from the fan section 22 provides for alternate locations of the core engine 24 to create space within the nacelle 56 for additional components useful in alternate engine architectures. In one example embodiment shown in FIG. 1, the core engine 24 is located aft of a power turbine 36. The power turbine 36 drives a fan drive gear system 40 through a coupling shaft 38. A power turbine shaft 50 is coupled between the fan drive gear system 40 and the fan section to drive the fan section 22.

The spaced apart location of the core engine 24 results in a long power turbine shaft 50. Long, unsupported shafts may present rotor dynamic challenges that are not present in conventional engine architectures with nested concentric shaft where the core engine 24 is mechanically coupled directly to the fan section 22. The relative high speed of the power turbine 36 relative to the speed of the fan section 22 further introduces rotor dynamic challenges. The example propulsion system 20 mounts the fan drive gear system 40 proximate the power turbine 36 such that the power turbine shaft 50 rotates at slower speeds. The slower rotational speeds provided by locating the fan drive gear 40 proximate the power turbine 36 improves rotor dynamic stability of the long power turbine shaft 50.

The example core engine 24 defines a core flow path C through a compressor section 26 that communicates a pressurized inlet airflow 34 to a combustor section 28 where it is mixed with fuel 76 from a fuel system 74 and ignited to generate an exhaust gas flow 32. The exhaust gas flow 32 expands through a main turbine section 30 that is coupled to drive the compressor section 26. The exhaust gas flow 32 is then expanded through the power turbine 36. The power turbine 36 is not mechanically coupled to the core engine 24 and therefore rotates independent of the compressor section 26 and main turbine section 30 of the core engine 24.

The fuel system 74 is shown schematically and may provide a flow of a liquid hydrogen ($LH_2$) fuel to the core engine 24. Although liquid hydrogen is described by way of example, other non-carbon based fuels, biofuels and sustainable aviation fuels could also be utilized and are within the scope and contemplation of this disclosure. Additionally, traditional carbon-based fuels could also be utilized and are within the contemplation and scope of this disclosure.

The location of the example core engine 24 provides additional space for other systems for improving engine efficiencies. Such systems may be located in the space between the fan section 22 and the core engine 24. Moreover, such systems may also be at least partially located within the nacelle 56.

In one disclosed example, the propulsion system 20 includes a heat recovery system 66 that utilizes heat from the exhaust gas flow 32 to generate a steam flow 72 that is injected into the core engine 24. The heat recovery system 66 includes a condenser 70 that uses a cooling flow 25 to condense water into a liquid form from the exhaust gas flow 32. The recovered water 35 is then vaporized in an evaporator 68 with heat from the exhaust gas flow 32. The resulting steam flow injected into the core engine 24 improves engine efficiencies by increasing mass flow through the main turbine section 30 without corresponding extra work by the compressor section 26. Portions of the evaporator 68, condenser 70 and any required ducting may be located within the nacelle 56 and/or within the space between the fan section 22 and the core engine 24.

Although the heat recovery system 66 is shown and described by way of example, other systems for recovering thermal energy may be utilized and are within the scope and contemplation of this disclosure.

The core engine 24 and the fan section 22 are disposed within the nacelle 56 that defines a bypass flow path B. The fan section 22 includes a fan 100 with a plurality of fan blades 98 supported on a fan hub 102. The fan hub 102 is coupled through a forward coupling 46 to the power turbine shaft 50. The fan hub 102 and forward end of the power turbine shaft 50 are supported by forward bearings 48. The forward bearings 48 are supported by fan exit guide vanes 64 that extend radially outward to a fan case 45.

The fan drive gear system 40 is driven by the power turbine 36 and supported well aft of the fan section 22 by a support structure 54. The example fan drive gear system 40 may be an epicycle gear train, such as a planetary gear system or other gear system, with a gear reduction ratio between about 2.5:1 and 5:1.

The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the power turbine shaft 50. In one example embodiment, the gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0.

The above parameters are only exemplary of one embodiment of a fan drive gear system 40 and other gear system configurations may be utilized within the contemplation and scope of this disclosure.

The example power turbine shaft 50, power turbine 36 and the core engine 24 are disposed along the engine longitudinal axis A and includes the axial length 52 between the forward coupling 46 and an aft coupling 42. The axial length 52 is greater than an axial length 55 between the power turbine 36 and the fan drive gear system 40. The example power turbine shaft is supported in the fan section 22 by the forward bearing assembly 48 and adjacent the gear system 40 by the aft bearing assembly 44. The space between the bearing assemblies 48 and 44 is not supported by any additional bearing systems or structures.

The power turbine 36, core engine 24 and the fan drive gear system 40 are mounted within the support structure 54 along the axis A. The support structure 54 includes a fairing section 62 that extends radially between a center portion 58 and an outer portion 60. The outer portion 60 extends axially forward to the fan section 22.

Referring to FIGS. 2 and 3 with continued reference to FIG. 1, the example support structure 54 is shown separate from the propulsion system 20 and includes the center portion 58 and the outer portion 60. The core engine 24, power turbine 36 and gear system 40 are supported in the center portion 58. Torque generated by the power turbine 36 and the gear system 40 is transferred through the fairing section 62 to the outer portion 60 and then through engine mounting structures that secure the engine to the aircraft.

The fairing section 62 includes a plurality of individual fairings 78. Each of the fairings 78 extend from an outer periphery 90 of the center portion 58. The example fairings 78 are canted such that each fairing 78 extends along a line 80 that is tangent to the outer periphery 90. The tangent, canted orientation of each of the fairings 78 between the center portion 58 and the outer portion 60 provides for the transfer of the increased torque forces generated by the power turbine 36 and gear system 40.

The center portion 58 extends axially a length 82 and includes gear supports 86 and bearing supports 88. The axial length 82 provides for mounting of the gear system 40, power turbine 36 and the core engine 24.

The outer portion includes an axial length 84 that provides a mechanical connection 124 (FIG. 1) of the support structure to the fan case 45 of the fan section 22. The connection 124 of the fan case 45 to the support structure 54 provides for increased rigidity and alignment of the fan 100, power turbine shaft 50, gear system 40, power turbine 36, and the core engine 24.

Figure 4:
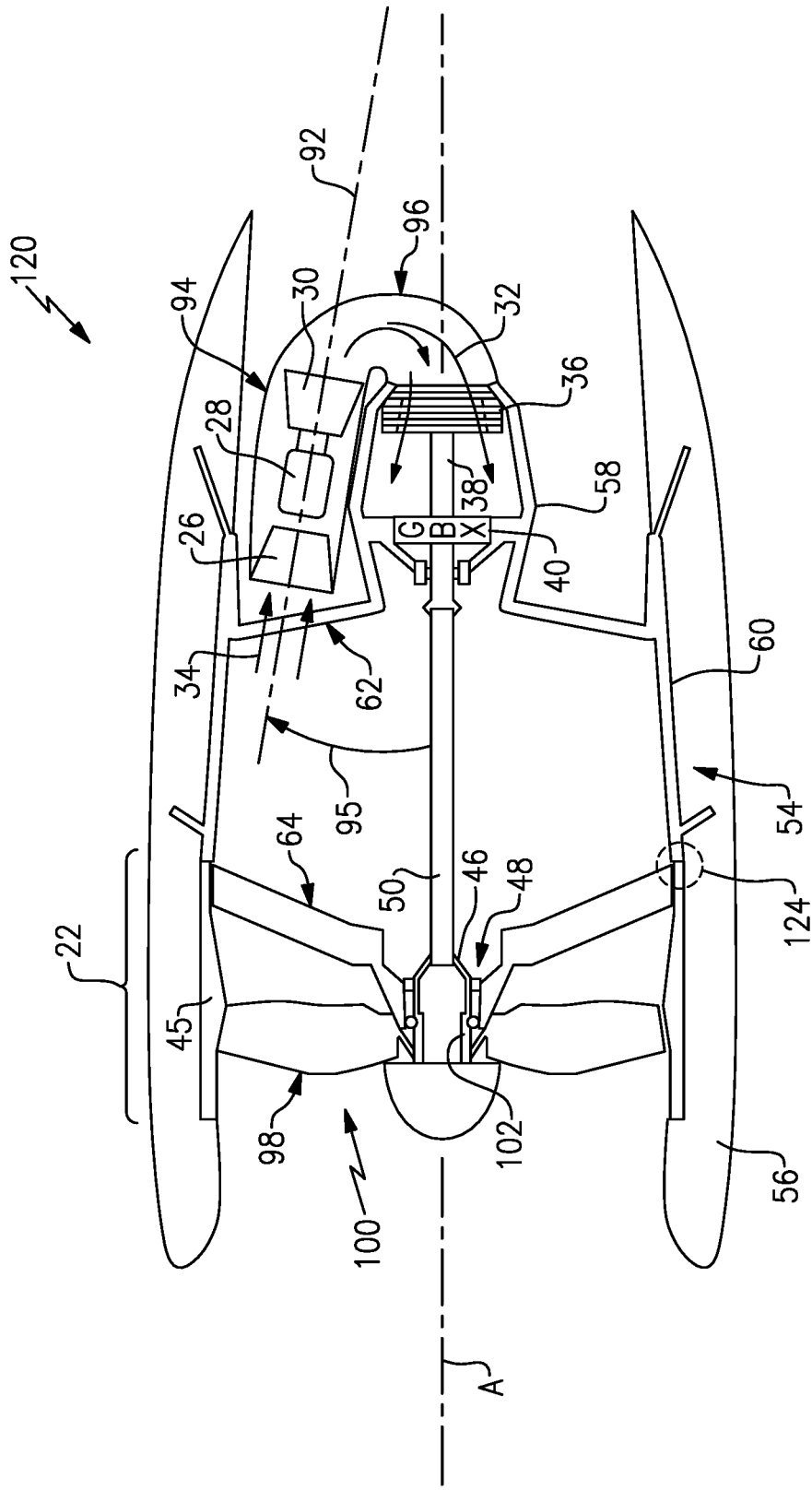
FIG. 4 is a schematic view of another example aircraft propulsion system embodiment.

Referring to FIG. 4 with continued reference to FIG. 1, another example propulsion system 120 is shown schematically and includes an inclined core engine 94. The core engine 94 is disposed along a core engine axis 92 that is inclined at an angle 95 relative to the fan axis A. A duct 96 is provided to route the exhaust gas flow 32 to the power turbine 36. The support structure 54 maintains the previously disclosed features and structures for reacting torque generated by the power turbine 36 and the gear system 40. Additional mounting structures may be included to accommodate the angled orientation of the core engine 94. The angled orientation of the core engine axis 94 provides space for additional structures and systems within the nacelle 56 utilized for alternate propulsion system architectures. It should be understood that other engine architectures and core orientations could be utilized and are within the contemplation of this disclosure.

Figure 5:
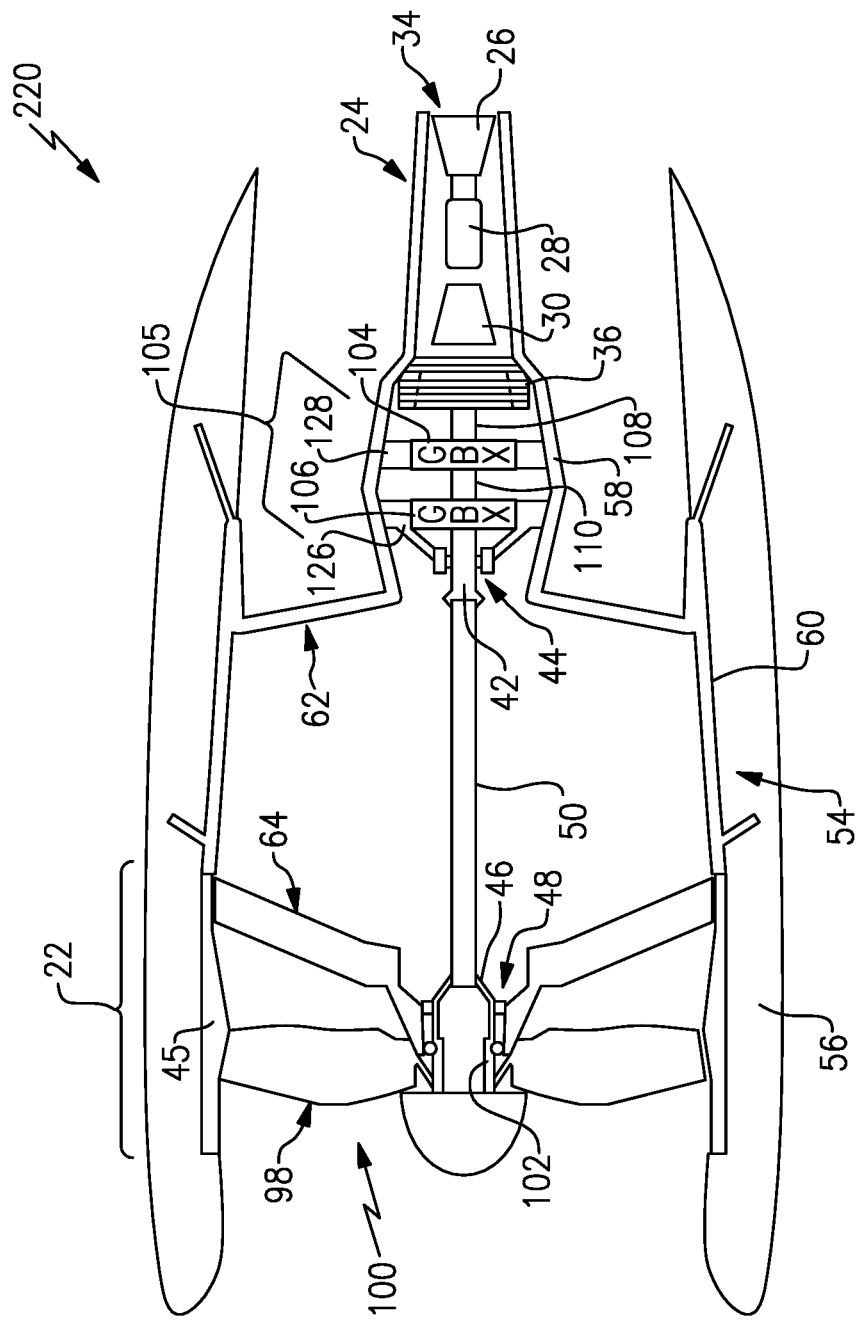
FIG. 5 is a schematic view of yet another example aircraft propulsion system embodiment.

Referring to FIG. 5, another aircraft propulsion system 220 is shown and includes common features as described with regard to the propulsion system 20 but not shown for clarity purposes. For example, the propulsion system 220 may include the heat recovery system 66 and the fuel system 74 as shown in FIG. 1.

The propulsion system 220 includes a combined gear system 105. The example combined gear system 105 includes a first gearbox 104 and a second gearbox 106. The first gearbox 104 is driven by the power turbine 36 through a first coupling shaft 108 and the second gear box 106 is driven through a second coupling shaft 110 by the first gearbox 104.

The support structure 54 includes gear mounts 128 and 126 to accommodate the two gearboxes 104 and 106. The use of two gear boxes provides additional gear reduction options such that the overall gear reduction may be greater than a similar single gear system within the same space. In one example embodiment, the combination gear system 105 may provide a gear reduction in the range of between 9 and 16.

Figure 6:
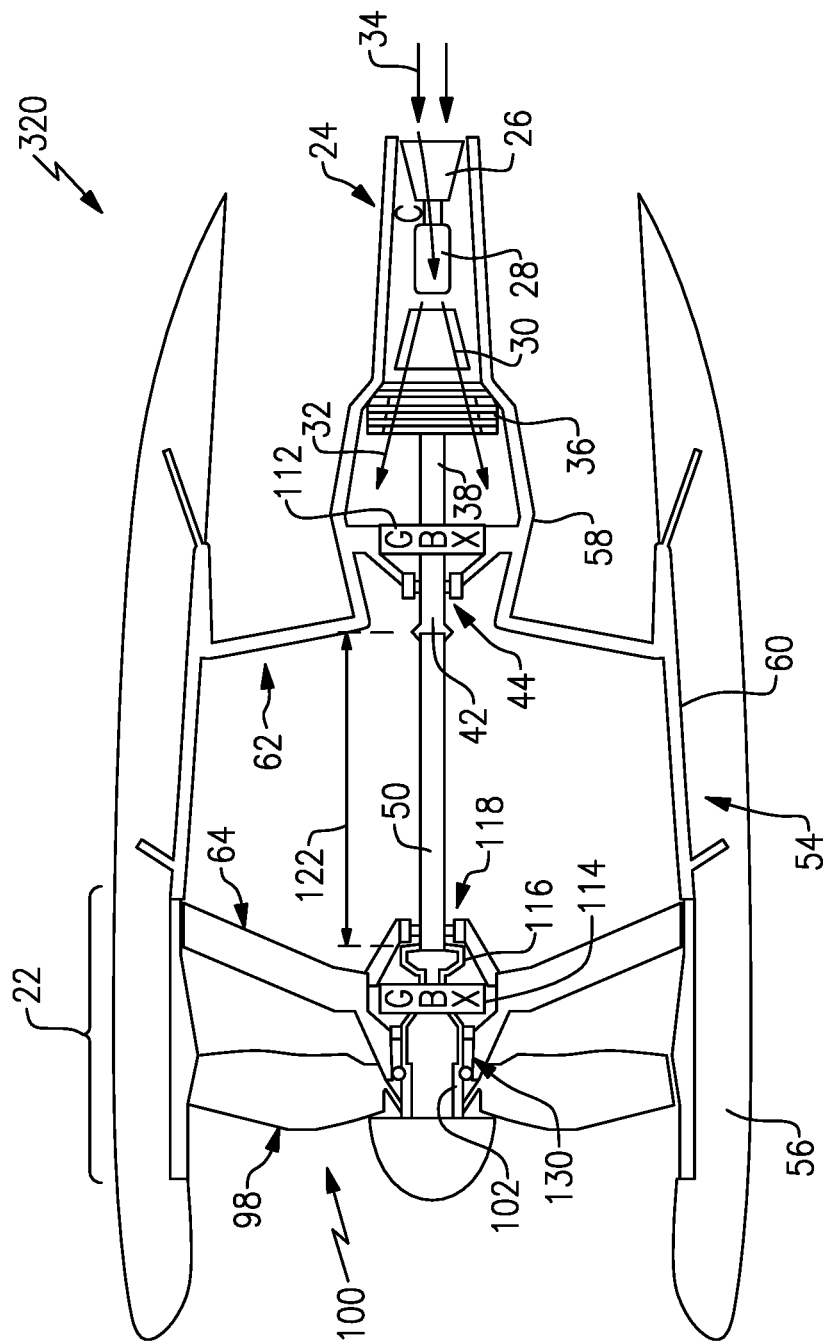
FIG. 6 is a schematic view of still another example aircraft propulsion system embodiment.

Referring to FIG. 6, another propulsion system 320 is schematically shown and includes a first gearbox 112 that drives a second gearbox 114 through the power turbine shaft 50. The first gearbox 112 is driven by the power turbine 36 through the coupling shaft 38. The second gearbox 114 is mounted in the fan section 22.

A forward shaft bearing assembly 118 supports the forward end of the power turbine shaft 50 near a forward coupling 116 to the second gearbox 114. A hub bearing assembly 130 is provided to support the fan hub 102 forward of the second gearbox 114. The power turbine shaft 50 includes an axial length 122 in this example that extends between the forward coupling 116 and the aft coupling 42. The example configuration of the first and second gearboxes 112, 114 maintains a gearbox arranged within the fan section 22 while still providing for a slower rotating power turbine shaft 50. Moreover, the use of the two gearboxes 112, 114 increases the range of possible gear ratios. In one example embodiment, a speed reduction ratio between the power turbine 36 and the fan 100 is between 9 and 16. Other possible speed reduction ratios may be used and are within the contemplation and scope of this disclosure.

Accordingly, the example propulsion systems provide for a reduced operational speed range of a power turbine shaft to improve rotor dynamic stability while also providing additional space for incorporation of heat recovery systems.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a propulsor section including a fan with a plurality of fan blades rotatable about a fan axis;
   a core engine configured to generate a gas flow;
   a power turbine mechanically uncoupled from the core engine and rotatable independent of the core engine, wherein the gas flow from the core engine is expanded through the power turbine to generate shaft power;
   a support structure where the power turbine is mounted relative the core engine;

a fan drive gear system driven by the power turbine and at least partially mounted to the support structure; and a power turbine shaft including a first coupling to the fan drive gear system and a second coupling to the propulsor section, wherein the support structure includes a fairing section including a plurality of fairings extending between a center portion and an outer portion, wherein each of the plurality of fairings is tangential to an outer periphery of the center portion and the center portion includes an aft portion that extends axially aft from the fairing section and the power turbine is attached to the aft portion.

2. The propulsion system as recited in claim 1, wherein an axial length of the power turbine shaft between the first coupling and the second coupling is greater than an axial length between the power turbine and the fan drive gear system.

3. The propulsion system as recited in claim 1, wherein the support structure extends axially between a fan exit guide vane and the core engine.

4. The propulsion system as recited in claim 1, wherein the fan drive gear system is attached to the aft portion between the power turbine and the fairing section.

5. The propulsion system as recited in claim 1, wherein the fan drive gear system comprises a first gearbox mounted in the propulsor section and a second gearbox mounted to the support structure.

6. The propulsion system as recited in claim 1, wherein the fan drive gear system comprises a first gearbox and a second gearbox both mounted to the support structure.

7. The propulsion system as recited in claim 1, wherein the propulsor section is forward of the power turbine and the core engine is disposed aft of the power turbine.

8. The propulsion system as recited in claim 1, wherein the core engine is centered on a core axis that is inclined relative to the fan axis.

9. The propulsion system as recited in claim 1, further comprising a nacelle surrounding the core engine and the propulsor section, the nacelle defining a bypass flow path through the nacelle and around the power turbine and the core engine.

10. The propulsion system as recited in claim 9, further comprising a heat recovery system at least partially supported by at least one of the support structure and the nacelle.

11. An aircraft turbine engine assembly comprising:

a fan section including a fan with a plurality of fan blades rotatable about a fan axis;

a core engine defining a core flow path where air is compressed in a compressor section, communicated to a combustor section, mixed with fuel, and ignited to generate a gas flow that is expanded through a main turbine section;

a power turbine mechanically uncoupled from the core engine and rotatable independent of the core engine, wherein the gas flow from the core engine is expanded through the power turbine to generate shaft power;

a support structure where the power turbine is mounted relative the core engine;

a fan drive gear system driven by the power turbine and at least partially mounted to the support structure; and a power turbine shaft including a first coupling to the fan drive gear system and a second coupling to the fan, wherein an axial length of the power turbine shaft between the first coupling and the second coupling is greater than an axial length between the power turbine and the fan drive gear system, wherein the support structure includes a fairing section including a plurality of fairings extending between a center portion and an outer portion, wherein each of the plurality of fairings is tangential to an outer periphery of the center portion and the center portion includes an aft portion that extends axially aft from the fairing section and the power turbine is attached to the aft portion.

12. The aircraft turbine engine assembly as recited in claim 11, wherein the fan drive gear system comprises a first gearbox mounted in the fan section and a second gearbox mounted to the support structure.

13. The aircraft turbine engine assembly as recited in claim 11, wherein the fan drive gear system comprises a first gearbox coupled to a second gearbox with both mounted to the support structure.

14. The aircraft turbine engine assembly as recited in claim 11, wherein the core engine is centered on a core axis that is inclined relative to the fan axis.

15. The aircraft turbine engine assembly as recited in claim 11, further comprising a nacelle surrounding the core engine and the fan, the nacelle defining a bypass flow path through the nacelle and around the power turbine and the core engine.

16. A method of operating an aircraft turbine engine assembly comprising:

generating a gas flow with a core engine;

expanding the gas flow through a power turbine that is mechanically decoupled from the core engine;

driving a gear system with the power turbine;

driving a fan with a power turbine shaft driven by the gear system at a speed less than that of the power turbine, wherein the power turbine shaft is of an axial length that is greater than an axial length between the gear system and the power turbine; and supporting the gear system with a support structure including a fairing section including a plurality of fairings extending between a center portion and an outer portion, wherein each of the plurality of fairings is tangential to an outer periphery of the center portion and the center portion includes an aft portion that extends axially aft from the fairing section and the power turbine is attached to the aft portion.

* * * * *